219-121.

6-19-73 OR 3,740,523

SR

United States Patent [19]

Cohen et al.

[11] 3,740,523

[45] June 19, 1973

[54] ENCODING OF READ ONLY MEMORY BY LASER VAPORIZATION

[75] Inventors: Melvin Irwin Cohen, Berkeley Heights, N.J.; Alan William Fulton, Naperville, Ill.

[73] Assignee: Bell Telephone Labortories, Incorporated, Murray Hill, N.J.

[22] Filed: Dec. 30, 1971

[21] Appl. No.: 214,343

[52] U.S. Cl. .............................. 219/121 LM, 156/2

[51] Int. Cl. .............................. B23k 9/00

[58] Field of Search .............. 219/121 L, 121 FB; 156/2, 17; 331/94 SA

[56] References Cited

UNITED STATES PATENTS

| | | | |
|---|---|---|---|
| 3,530,573 | 9/1970 | Aelgeland | 29/620 |
| 3,642,548 | 2/1972 | Eger | 156/17 |
| 3,584,183 | 6/1971 | Chiaretta et al. | 219/121 LM |

OTHER PUBLICATIONS

"Burnt Into a Memory" Electronics 12/68 p. 37.

"Selectively Removing Dielectric Materials" IBM Technical Disclosure Bulletin Vol 11, No. 9, 2/69 pg. 1151.

*Primary Examiner*—J. V. Truhe
*Assistant Examiner*—George A. Montanye
*Attorney*—W. L. Keefauver

[57] ABSTRACT

A beam-lead silicon integrated circuit read-only memory is made in a conventional manner by forming an array of transistors on a silicon substrate, except that the gold portion of one conductive lead to each memory cell is severed, as by gold etching. Conductive connection to each memory cell is, however, maintained by the platinum-titanium intermediate layer that underlays the gold conductor. The array is permanently encoded by selectively vaporizing, with a laser beam, the exposed platinum layer of certain memory cells. This technique permits laser encoding of a beam-lead silicon integrated circuit with a sufficiently low power beam as not to endanger the silicon substrate.

4 Claims, 2 Drawing Figures

ENCODING OF READ ONLY MEMORY BY LASER VAPORIZATION

BACKGROUND OF THE INVENTION

This invention relates to methods for accurately severing selected conductors in complex electronic circuits, as is required for encoding read-only memories.

Modern digital data processing units make extensive use of electronic memory circuit arrays in which an electronic device or storage cell is capable of storing information representative of a digital "one" or "zero." While the information in most such storage cells is capable of being altered or "rewritten," it is sometimes advantageous to use permanently encoded "read-only" memories, in which the stored information is not alterable.

The primary advantage of read-only memories is that, since the stored information need not be altered, they can be made and operated more inexpensively than conventional memories. For example, each storage cell may comprise a transistor or a diode having at least one lead which is either open-circuited or short-circuited; if the lead is severed or open-circuited, the storage cell may be taken as storing a one, while, if it is left intact, it is taken as defining a zero. Thus, when the circuits are initially fabricated, they are permanently coded by severing selected leads of a large array of memory or storage cells.

The fabrication of read-only memory circuits obviously lends itself to integrated circuit techniques in which extensive circuitry is defined on a single semiconductor chip substrate. One can selectively sever certain leads in such a circuit by photolithographic masking and selective etching; but this complicates circuit fabrication and may not always be accurate, particularly if each circuit to be made is separately encoded so as to perform a different data processing function.

The article "Burnt into a Memory," Electronics, Volume 41, No. 26, Dec. 23, 1968, page 37, describes a method for encoding a read-only memory by using a laser to sever selected leads by vaporization. The integrated circuit memory is formed by evaporating aluminum circuit conductors on a sapphire semiconductor substrate in which diode storage cells have been formed. Because of the transparency of sapphire, the vaporizing laser beam may be focused directly on the aluminum leads or may be transmitted through the sapphire substrate onto the aluminum.

The most widely used substrate for integrated circuits is not sapphire, but silicon. One problem with using the laser cutting technique with a silicon substrate is that silicon absorbs much of the laser beam, and if the laser power is too high, it may damage the crystal structure. Another relevant consideration is that it is often desirable to use gold conductors in such circuits, particularly in silicon integrated circuits. Gold is an excellent electrical conductor, and can be made sufficiently strong to support structurally the semiconductor substrate. Such gold conductors, when extended beyond the substrate in a cantilever configuration, are known as "beam leads" and the technology making use of such structural components in integrated circuits is known as "beam-lead technology."

We have found that gold leads are more difficult to cut with a laser than are aluminum leads because they are typically thicker and their reflectance is fairly high. The relatively high-power laser beam required for vaporization tends to damage the semiconductor substrate, and this is particularly true if silicon is used as the substrate.

SUMMARY OF THE INVENTION

Accordingly, it is an object of this invention to increase the ease and convenience with which read-only memory arrays may be permanently encoded.

More specifically, it is an object of this invention to increase the ease and convenience by which read-only memory arrays comprising silicon beam-lead integrated circuits can be encoded.

It is another object of this invention to increase the ease and convenience by which gold leads forming part of a silicon integrated circuit can be selectively severed.

The present invention takes advantage of the platinum-titanium intermediate layers that are invariably used between the substrate and gold leads of silicon beam-lead integrated circuits to give chemical stability and good adherence.

In accordance with the invention, the gold portion of a section of each conductor connection to each memory cell is omitted or severed, with the platinum-titanium intermediate layer being maintained as a bridge conductor. The platinum-titanium layer is sufficiently conductive to conduct current between the severed gold portions without substantial losses. It is, however, extremely thin and of low reflectance, and therefore easily vaporizable with a relatively low power focused laser beam. Thus, the platinum-titanium bridging links may be selectively vaporized to form the selective open circuits required for read-only memory encoding, without endangering the silicon substrate.

It can be appreciated that the invention permits simultaneous attainment of the advantages realized in the use of a silicon substrate, beam-lead technology, and laser beam coding. These and other objects, features and advantages of the invention will be better understood from the consideration of the following description taken in conjunction with the accompanying drawing.

DRAWING DESCRIPTION

FIG. 1 is a perspective sectional view of part of a read-only memory storage cell using the conventional beam-lead technology interconnections as known in the art; and FIG. 2 is a view of the storage cell of FIG. 1 omitting a gold section.

DETAILED DESCRIPTION

Figure 1:
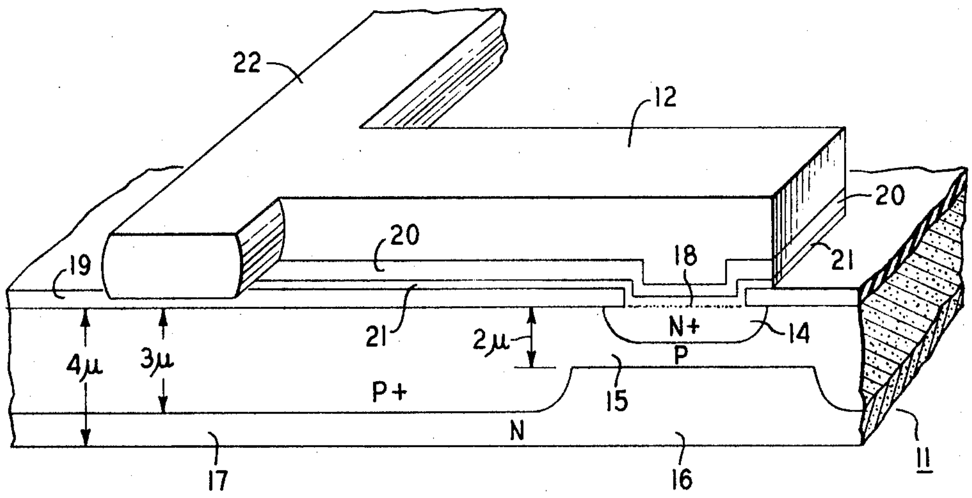
FIG. 1 (PRIOR ART)

Referring now to FIG. 1, there is shown a partially fabricated storage cell 11 which is one component of a memory array and is connected to the remainder of the array by a conductive lead 12, as is known in the art. The storage cell 11 is illustratively a transistor having emitter, base and collector regions 14, 15 and 16, respectively. The storage cell is part of a read-only memory which, as is well-known, is encoded by severing selected leads 12 of certain component storage cells. For example, if lead 12 is severed, storage cell 11 may be taken as being representative of a stored digit one, while if it is left intact, the cell may be taken as representing a stored digit zero. The present invention is concerned with techniques for conveniently and accurately severing the conductive path along lead 12 such as to open-circuit the storage cell 11, if so desired.

The storage cell 11 is made in a conventional manner by multiple diffusion of impurities into a silicon semiconductor substrate 17 through the use of masks made by photolithographic techniques. Silicon, of course, offers numerous advantages in the fabrication of extensive repetitive transistor circuits such as memory circuits. Overlaying most of the substrate is an insulative layer 19 of silicon dioxide which electrically insulates each storage cell and is preferably made by exposing the substrate 19 to an oxygenated atmosphere.

The beam-lead conductors, such as lead 12, are made by evaporating first a layer of titanium 21, then a layer of platinum 20 over the entire assembly. These two metals are shaped by masking and etching into the circuit configuration and together constitute an intermediate layer. Gold is then evaporated over the assembly and masked and etched to form the leads 12 and 22 overlaying the intermediate layer. As mentioned before, beam-lead structures have the advantage of being structurally supportive, which simplifies the problems of circuit interconnection and device encapsulation. Beam-lead technology in conjunction with silicon integrated circuits is very well-known and widely used; the foregoing steps are well-understood in the art and are easy to implement.

Figure 2:
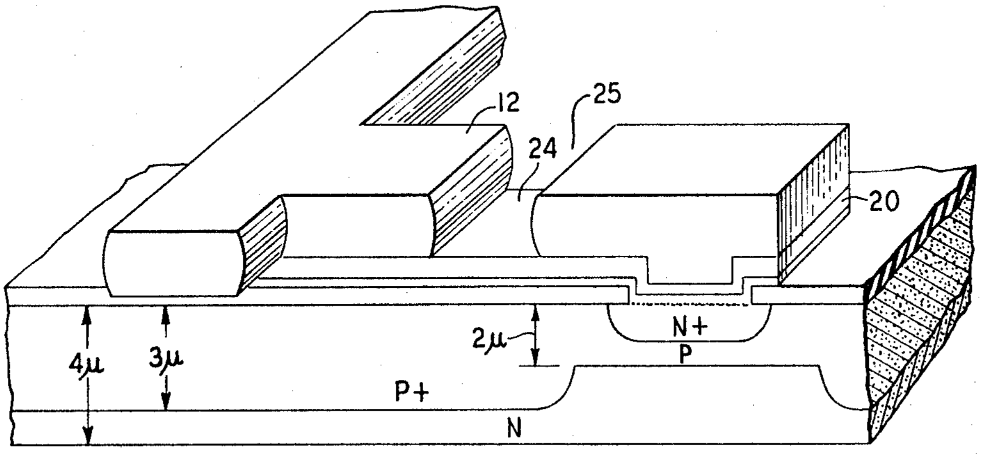

In accordance with the invention, during the gold etch, a window 22 is formed in each lead 12 of each storage cell of the memory array, as shown in FIG. 2. The platinum-titanium intermediate layer beneath the gold beam-lead portion is not severed, however, and therefore constitutes a bridge conductor 24 between the gold beam-lead portions. The bridge conductor 24 transmits currents to and from the storage cell 11 and, in the absence of further processing, the window 25 would have virtually no effect on the operation of the storage cell 11 or the memory array of which it is a part. The bridge conductor 24 is thinner and somewhat more resistive than a normal gold beam lead, but, because it is physically short, the added resistive and reactive losses are negligible. The windows 25 in the gold leads are typically less than a mil in length and may be made during the usual gold etch step or as a separate step with an etchant that selectively dissolves gold, such as a solution of 400 grams KI, and 100 grams $I_2$ in 400 cubic centimeters of $H_2O$.

The memory array is next encoded by severing bridge conductors 24 of selected storage cells with a laser beam. If it is desired to sever the bridge conductor 24 of a given storage cell, a laser beam is focused on the bridge conductor 24 such that the entire area of the bridge conductor is exposed to the laser beam spot. The laser beam is made to be of sufficient intensity to vaporize the entire bridge conductor when so focused on it. As mentioned before, whether the bridge conductor is vaporized depends on whether one wishes to encode a one or a zero into the storage cell.

The principal advantage of the invention is that the bridge conductor 24 can be vaporized with a sufficiently low intensity laser beam to avoid any possiblity of damage of the silicon substrate. This is due partly to the inherently thin structure of the platinum-titanium intermediate layer, but primarily to the relatively low reflectance of platinum and titanium. Low reflectance, of course, results in a high absorption of the laser light beam with high conversion to heat for metal vaporization. Another advantage is that a relatively large spot size of the laser beam can be used, which reduces the required beam positioning accuracy.

Specifically, we have found that a laser beam intensity or power density of 0.21 to 0.36 × $10^8$ watts per $cm^2$ yields excellent results. These low intensity requirements permit focusing of the laser beam to a relatively large spot of 1.5 mils in diameter. It is apparent to those skilled in the art that neither positioning accuracy nor power density accuracy are critical, but rather, may vary within wide ranges. In contradistinction, to vaporize gold leads, the power density must be 0.83 × $10^8$ watts per $cm^2$ and this level must be maintained to within an accuracy of ±3 percent. We have further determined that the threshold of possible silicon substrate damage is 0.37 × $10^8$ watts per $cm^2$; hence, using a laser beam to vaporize conductors such as gold is almost certain to damage the silicon substrate, while, with our technique, there is no danger of silicon damage.

Experimental memory arrays encoded by our technique include a 60 square mil silicon chip comprising a 16 word by 16 bit emitter-follower transistor matrix; that is, 256 transistors of the type shown in FIGS. 1 and 2 were included on the single chip. The titanium, platinum, and gold layers were evaporated to thickness of approximately 1,000 angstroms, 2,500 angstroms and 2 micrometers, respectively. Prior to metal evaporation, a platinum silicide region 18 was formed to give a good ohmic contact to the silicon, as is conventional in the art. The bridge conductor dimensions were 0.2 × 0.6 mils. The laser spot size of 1.5 mils of course overlapped a substantial area of the structure surrounding the bridge conductor, but because of its relatively low power did not damage any surrounding structure. The bridge conductors left intact conducted current dependably as described before. The laser used was a neodymium-YAG laser giving a predominant output wavelength of 1.06 micrometers.

In view of the foregoing, one can appreciate that our technique permits laser beam encoding of read-only memories, while permitting advantage to be taken of the most desirable aspects of both beam-lead technology and silicon integrated circuit technology. By the simple expedient of removing a small portion of the gold component of the lead of each storage cell, one can permanently encode with a laser beam of sufficiently low intensity to eliminate the hazard substrate damage. The low intensity requirements permit the use of a large laser spot size, and relatively large deviations in positioning accuracy and in beam power. It is clear, however, that the technique described is advantageous for use in circuits other than those explicitly described.

Various other embodiments and modifications may be devised by those skilled in the art without departing from the spirit and scope of the invention.

What is claimed is:

1. In a method for fabricating silicon integrated circuits comprising the steps of forming electronic devices in a silicon substrate, forming an insulative layer of silicon dioxide over a major part of the substrate, evaporating a thin layer of titanium onto the insulative layer, evaporating a layer of platinum onto the titanium layer, evaporating a layer of gold onto the platinum layer, and etching the gold and platinum layers to form beam lead conductors, the improvement comprising the step of:

forming a window in the gold portion of each beam lead conductor, thereby to expose a platinum-titanium bridge conductor in each beam lead;

and vaporizing selected platinum-titanium bridge conductors by directing a focused laser beam upon selected bridge conductors.

2. A method for producing a read-only memory by beam-lead technology comprising the steps of:

forming a plurality of memory cells in a silicon substrate;

forming metal conductors extending to each memory cell comprising the steps of first, forming an insulative layer of silicon dioxide of a major part of the substrate, second, forming a thin layer of titanium on the insulative layer, third, forming a thin layer of platinum on the titanium layer, and fourth, forming over the platinum layer a layer of gold that is relatively thick with respect to the platinum and titanium layers, thereby to provide structural support in accordance with the principles of beam-lead technology;

forming a window in the gold portion of each conductor, thereby to expose a platinum-titanium bridge conductor in each conductor;

and coding the read-only memory comprising the step of vaporizing selected platinum-titanium bridge conductors by directing a focused laser beam upon said selected conductors, the intensity of said focused beam being sufficiently high to vaporize the platinum-titanium bridge conductor, but being insufficiently high to vaporize the gold portion or to damage the silicon substrate.

3. The method of claim 2 wherein:

the intensity of said focused beam is less than $0.37 \times 10^8$ watts per square centimeter.

4. The method of claim 3 wherein:

the wavelength of the focused laser beam is on the order of 1.06 micrometers.

* * * * *